Dec. 18, 1951  Q. P. MASSARE ET AL  2,578,893
MULTIPLE SPEED GEAR MECHANISM
Filed June 10, 1950  2 SHEETS—SHEET 2
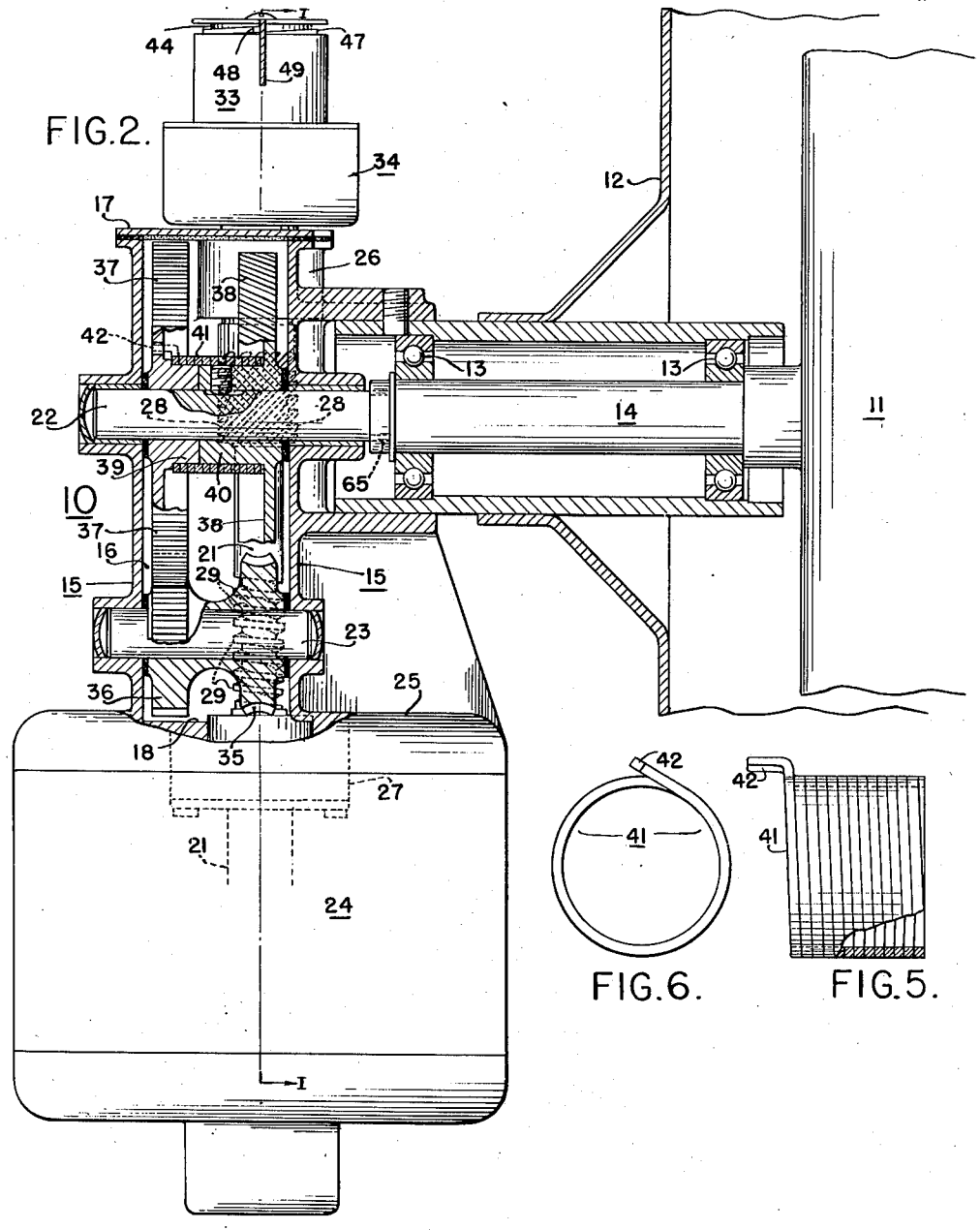
WITNESSES
INVENTORS:—
QUIDO P. MASSARE AND
HILBERT E. EDWARDS, DECEASED
BY JEAN FYFE EDWARDS, EXECUTRIX
BY
ATTORNEY Patented Dec. 18, 1951

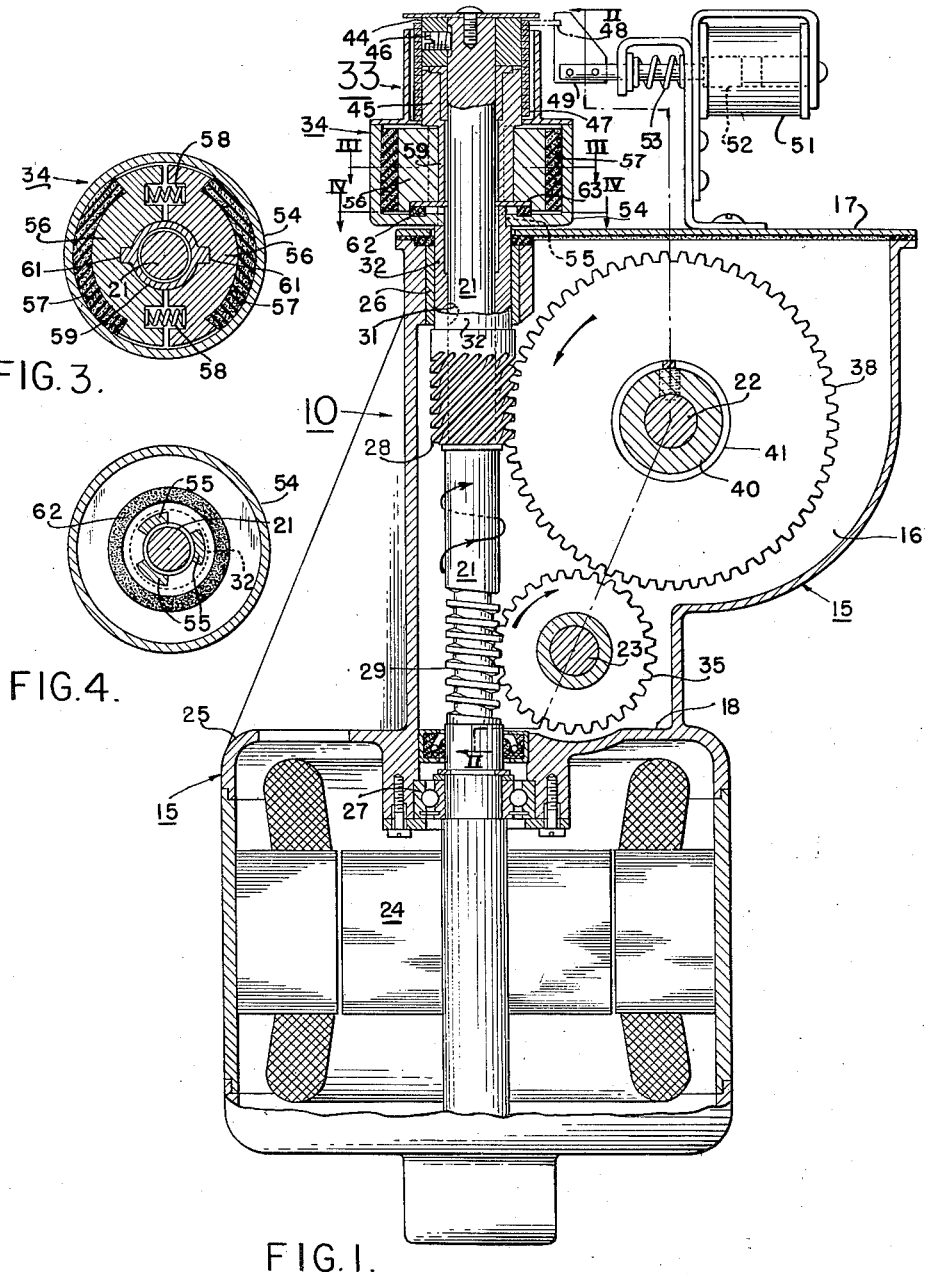

2,578,893

UNITED STATES PATENT OFFICE 2,578,893

MULTIPLE-SPEED GEAR MECHANISM

Quido P. Massare, Mansfield, Ohio, and Hilbert E. Edwards, deceased, late of Mansfield, Ohio, by Jean Fyfe Edwards, executrix, Mansfield, Ohio, assignors to Westinghouse Electric Corporation, East Pittsburgh, Pa., a corporation of Pennsylvania Application June 10, 1950, Serial No. 167,354

8 Claims. (Cl. 74—425.5)

This invention relates to multiple speed gear mechanisms particularly adapted for driving the basket of a domestic washing and centrifuging machine at low and high speeds and it has for an object to provide an improved mechanism of this kind.

A further object of the invention is to provide gear mechanism of the type set forth which may be inexpensively produced and which will be reliable in operation over long periods of use.

Another object of the invention is to provide, in a mechanism of the class set forth, smooth acceleration of the driven shaft of the mechanism from its low to its high speed without overloading the driving motor or subjecting the gearing to large stresses.

These and other objects are effected by the invention as will be apparent from the following description and claims taken in connection with the accompayning drawings, forming a part of this application, in which:

Fig. 1 is a sectional view of a gear mechanism constructed and arranged in accordance with the invention and taken along the line I—I of Fig. 2;

Fig. 2 is a section taken along the line II—II of Fig. 1 with portions shown in elevation;

Figs. 3 and 4 are sections taken along the respective lines III—III and IV—IV of Fig. 1; and Figs. 5 and 6 are side and end views, respectively, of spring wire clutches employed in the gear mechanism disclosed in Fig. 1.

Referring now to the drawings, a two speed mechanism constructed in accordance with the invention is shown generally at 10 for rotating the basket of a washing and centrifuging machine, which basket is indicated in part at 11. A portion of the tub of the washer is shown at 12 supporting bearings 13 for a shaft 14, the latter carrying the basket 11. Further description of the washing machine is deemed unnecessary as the specific details of the washer to which the gear mechanism is applied form no part of the present invention. It is only necessary to state that the basket 11 is rotated at low and high speeds of, for example, 47 R. P. M. and 500 R. P. M. for respectively washing and centrifuging of fabrics. A washer of this general type and the method of washing and centrifuging fabrics therein are disclosed in Breckenridge Patent No. 2,296,258, granted September 22, 1942.

The mechanism 10 includes a casing 15 having a gear chamber 16 formed therein which is closed by upper and lower walls 17 and 18, respectively. The mechanism 10 further includes a driving shaft 21, a driven shaft 22 and a jack shaft 23 which is part of the low speed gearing. As shown, the driving shaft 21 extends through the end walls 17 and 18 of the gear casing 15 and is driven by an electric motor indicated at 24, the frame 25 of which is fixed to the gear casing 15. The driving shaft 21 is properly positioned by upper and lower bearings 26 and 27 carried by the gear casing 15.

The driving shaft 21 is provided with upper and lower driving gears, indicated at 28 and 29, respectively, the former being a spiral gear forming a part of the high speed gearing and the latter being a worm gear which forms a part of the low speed gearing. As shown, the worm 29 is fixed to the driving shaft 21 whereas the spiral gear 28 is hollow and provided with an internal bearing surface 31 for the shaft 21. The spiral gear 28 includes a cylindrical extension 32 which is journalled within the bearing 26. An adjustable clutch structure, generally indicated at 33, and a centrifugally operated slip clutch, generally indicated at 34, both of which will be described more in detail hereinafter, connect the shaft 21 to the spiral gear 28 when the latter is to be driven directly from the shaft 21 for providing high speed operation of the driven shaft 22, further reference to which is made hereinafter.

The worm 29 meshes with a worm wheel 35 which is fixed to and drives a pinion 36. The worm wheel 35 and pinion 36 may be integral, as shown in Fig. 2, and are rotatably supported upon the jack shaft 23 for rotation in unison. Meshing with the pinion 36 is a gear 37 carried by the driven shaft 22 but journalled thereon in order to provide for relative movement between the shaft 22 and the gear 37.

Meshing with the spiral gear 28 is a spiral follower or gear 38 which is carried or otherwise fixed to the shaft 22 for rotation therewith at all times. The gear 37 and the follower 38 are provided with meeting hubs 39 and 40, respectively. The outer surfaces of the hubs 39 and 40 are cylindrical in configuration and are engaged by a helical spring clutch 41, one end of which is upturned, as shown at 42 and disposed in a suitable recess formed in the gear 37 so that the spring clutch 41 rotates at all times with gear 37. The spring clutch member 41, as shown in Figs. 5 and 6, is preferably formed of wire square in cross section.

The spring clutch 41 is wound in such direction that, during slow speed operation of the driven shaft 22, the clutch member 41 constitutes a driving connection between the gear 37 and the gear 38 which, as set forth heretofore, is keyed to the driven shaft 22. During such operation, it will be understood that the adjustable clutch 33 is disengaged so that the driving shaft 21 may rotate within the helical pinion 28. During high speed operation of the driven shaft 22, the adjustable clutch 33 is engaged so that the spiral pinion 28 rotates in unison with the driving shaft 21. At this time, the follower 38 is driven and rotates the driven shaft 22 at high speed. Since the follower 38 is rotating at a higher speed than the gear 37, the clutch member 41 will slip in order to provide this overrunning operation.

The adjustable clutch structure 33 may be of any well understood construction but preferably is of the helical wire type. As shown, this clutch structure 33 includes driving and driven collars 44 and 45, respectively. The driving collar 44 is secured, as by means of a set screw 46, to the driving shaft 21 and the driven collar 45 operates as the driving member of the centrifugally operated clutch structure 34 which is to be described presently. Surrounding the driving and driven collars 44 and 45 is a helical spring clutch 47 which frictionally engages the cylindrical outer surfaces of the collars 44 and 45. In order to engage and disengage the clutch structure 33, the helical wire 47 is provided with an up-turned end portion 48 which, in the disengaged position of the clutch, contacts an arresting plate 49. In this position, the arresting plate prevents winding of the helical spring 47 and, therefore, gripping engagement between the driving collar 44 and the spring 47. When the arresting plate 49 is moved outwardly out of engagement with the up-turned end portion 48, the spring 47 is free to rotate with the collar 44 and winds firmly into engagement with both collars 44 and 45 to constitute a driving connection therebetween.

The arresting plate 49 may be moved in any well understood manner and, as shown, is magnetically operated. A magnet 51 when energized actuates the core 52 and arresting plate 49 to the right for releasing the spring 47 and, conversely, when the magnet 51 is deenergized, a compression spring 53 moves the arresting plate 49 into the path of movement of the up-turned end 48 of the spring 47.

The centrifugally operated slip or friction clutch structure 34 is interposed between the adjustable clutch 33 and the cylindrical drive extension 32 of the spiral gear 28. This clutch structure 34 includes a cup-shaped driven element 54 which is fixed to the cylindrical extension 32 of the helical gear 28 in any well understood manner. As shown, the cylindrical extension 32 has upstanding fingers 55 which extend within suitable openings provided in the lower wall of the cup member 54 (Figs 1 and 4). Arranged within the cup member 54 are a pair of weights 56, each of which is provided with an arcuate block of friction material 57 which engages the inner cylindrical surface of the cup member 54. These weights 56 are biased outwardly into engagement with the cup member 54 at all times by a pair of compression springs 58. The weights 56 are rotated by a sleeve 59 extending from the driven collar 45 downwardly between the weights 56. The sleeve extension 59, as best shown in Fig. 3, is provided with a pair of radially-outwardly extending keys 61 which are fitted within respective corresponding slots formed in the weights 56. A lubricant sealing ring indicated at 62 may be employed for preventing lubricant from moving outwardly from the shaft 21 into the interior of the cup member 54. As shown, the ring 62 is disposed between the bottom of the cup member 54 and a disc 63 fixed to the shaft 21 and rotatable therewith.

*Operation*

For effecting low speed operation of the driven shaft 22, the magnet 51 is deenergized so that the adjustable clutch 33 is disengaged as described heretofore. Accordingly, the driving shaft 21 is free to rotate within the spiral gear 28. At this time, the drive is from the shaft 21, which rotates at approximately 1725 R. P. M., through the worm wheel 35, the pinion 36 and the driven gear 37. The latter is tied to the gear 38 and shaft 22 at this time through the spring clutch 41 and the gear ratio is such that the shaft 22 is rotated at a speed of approximately 47 R. P. M. The shaft 22 and the shaft 14 of the basket are secured together in any well understood manner as by a spline connection indicated at 65 in Fig. 2. Accordingly, the basket 11 is rotated at low speed for washing the fabrics. During this operation it will be noted that the follower 38 drives the spiral pinion 28 at a speed, in the example given, of approximately 162 R. P. M. and in the same direction as the rotation of the shaft 21. This is of no moment, of course, because the adjustable clutch 33 is disengaged.

High speed operation of the shaft 22 is effected by energizing the magnet 51 whereupon the adjustable clutch 33 is engaged as described heretofore. Accordingly, the driving shaft 21 is now tied to the spiral gear 28 through the clutches 33 and 34. As soon as the clutch 33 is engaged, the driven collar 45 of the clutch 33 through the sleeve 59 initiates high speed rotation of the weights 56. The force of the compression springs 58 is sufficient to provide a driving connection between the rotating weights 56 and the cup 54 while providing for slipping between these members during acceleration or overload. Accordingly, the driving motor 24 and the gear mechanism, in general, are not subject to any severe, sudden shocks when the clutch 33 is engaged. Centrifugal force of the rotating weights 56 assists the springs 58 for increasing the friction between the weights and the cup member 54. At maximum speed of 1725 R. P. M. of the cup 54 there is substantially no slipping as the cup member 54 is frictionally driven by the rotating weights 56.

Accordingly, the spiral gear 28 is gradually accelerated following the engagement of the clutch 33 for gradually increasing the speed of the follower 38. It will be understood that, as the speed of the follower 38 increases above the speed of the gear 37, the overrunning spring clutch 41 will slip. At the end of the accelerating period, the follower 38 will drive the shafts 22 and 14 at a speed of approximately 500 R. P. M. in order to carry out a centrifuging operation in the basket 11.

Slow speed operation of the shaft 22 is again initiated, of course, by deenergizing the magnet 51 and disengaging the adjustable clutch 33. The shaft 22 and follower 38 then decelerate and, when the speed of the follower has been reduced to approximately 47 R. P. M., the overrunning clutch 41 again becomes effective to constitute a driving connection between the gear 37 and the shaft 22.

While this invention has been described as applied for the driving of a washing and centrifuging machine, it will be understood that the mechanism is susceptible of general application. It is, however, ideally suited for the described application because the mechanism may be economically and readily produced in quantities and operates smoothly and quietly and without imparting excessive stresses to any part of the mechanism during acceleration or deceleration of the driven shaft. Preferably, the gear casing is die cast of relatively light material and forms an end bell for the driving motor, as shown.

While the invention has been shown in but one form, it will be obvious to those skilled in the art that it is not so limited, but is susceptible of various changes and modifications without departing from the spirit thereof.

What is claimed is:

1. In a multiple speed gear mechanism, the combination of a driving shaft, a jack shaft and a driven shaft, a worm driven by the driving shaft, a worm wheel carried by the jack shaft and meshing with said worm, a pinion fixed to said worm wheel and rotatable therewith, a first gear journaled on the driven shaft for relative movement therewith and meshing with said pinion, a second gear fixed to said driven shaft, overrunning clutch means interposed between said first gear and said driven shaft, a second pinion meshing with said second gear, means for driving said second pinion from the driving shaft and including an adjustable clutch mechanism interposed between the driving shaft and the second pinion and means for engaging and disengaging said clutch mechanism.

2. The combination as claimed in claim 1 wherein said driving means includes a centrifugal friction clutch interposed between said adjustable clutch mechanism and said second pinion for driving the latter.

3. In a multiple speed gear mechanism, the combination of a driving shaft, a jack shaft angularly disposed with respect to the driving shaft, a driven shaft substantially parallel to the jack shaft, a worm driven by the driving shaft, a worm wheel carried by the jack shaft and meshing with said worm, a pinion carried by the jack shaft and driven by said worm wheel, a driven gear journaled on the driven shaft and meshing with said pinion, a spiral driving gear journaled on the driving shaft for relative movement therewith, a spiral follower fixed to the driven shaft and meshing with said spiral driving gear, overrunning clutch means interposed between said driven gear and said driven shaft, an adjustable clutch mechanism interposed between the driving shaft and said spiral driving gear and means for engaging and disengaging the adjustable clutch mechanism.

4. In a multiple speed gear mechanism, the combination of a driving shaft, a jack shaft, a driven shaft, a worm fixed to said driving shaft, a worm wheel carried by the jack shaft and meshing with said worm, a pinion carried by the jack shaft and driven by the worm wheel, a gear carried by the driven shaft and meshing with said pinion, said gear being journaled on the driven shaft, overrunning clutch means interposed between said gear and driven shaft, a spiral driving gear journaled on the driving shaft for relative movement therewith, a spiral driven gear fixed to the driven shaft and meshing with the spiral driving gear, an adjustable clutch driven by the driving shaft and including a driven element, a centrifugal clutch driven by the driven element of the adjustable clutch and including a driven member fixed to said spiral driving gear and means for engaging and disengaging said adjustable clutch.

5. In a multiple speed gear mechanism, the combination of a plurality of shafts including a driving shaft, a jack shaft and a driven shaft, a worm fixed to said driving shaft, a worm wheel carried by the jack shaft and meshing with said worm, a pinion carried by the jack shaft and fixed to the worm wheel for rotation therewith, a first driven gear meshing with said pinion and journaled on said driven shaft for relative movement therewith, overrunning clutch means interposed between said driven gear and the driven shaft, a spiral gear axially spaced from said worm and journaled on said driving shaft for relative movement therewith, a spiral follower fixed to said driven shaft and meshing with said spiral gear, adjustable clutch means driven by said driving shaft and including a driven member, adjusting means for engaging and disengaging said adjustable clutch means, and a centrifugally operated clutch mechanism having a plurality of weights rotated by said driven member of the adjustable clutch means, said weights having respective friction surfaces, a cupped element having a cylindrical wall encompassing said weights and engaged by said friction surfaces, means biasing said weights outwardly into engagement with said cylindrical wall and a collar driven by said cupped element and fixed to said spiral gear for driving the same.

6. In a multiple speed gear mechanism, the combination of a driving shaft, a driven shaft angularly disposed with respect to the driving shaft, first and second driving gears axially spaced on said driving shaft, axially spaced, first and second driven gears carried by the driven shaft, said second driving gear and said first driven gear being journaled on their respective shafts for relative movement therewith, an overrunning, unidirectional clutch interposed between said first driven gear and the driven shaft, an adjustable clutch mechanism connecting said second driving gear and the driving shaft, means for engaging and disengaging the adjustable clutch mechanism at will, said first driving gear and said second driven gear being fixed to their respective shafts, said second driving gear and said second driven gear being meshing gears, and gearing connecting the first driving gear and said first driven gear.

7. In a multiple speed gear mechanism, the combination of a driving shaft, a driven shaft arranged at an angle thereto, low and high speed driven gears, said low speed driven gear being journalled on the driven shaft for relative movement therebetween and said high speed driven gear being fixed to the driven shaft, gearing driven by the driving shaft for driving said low speed driven gear, a driving gear journalled on the driving shaft for relative movement therebetween and meshing with said high speed driven gear, adjustable clutch means interposed between the driving shaft and said driving gear, means for engaging and disengaging the adjustable clutch means and overrunning clutch means interposed between the low speed driven gear and said driven shaft.

8. In a multiple speed gear mechanism, the combination of a driving shaft, a jack shaft, a driven shaft, a worm fixed to said driving shaft, a worm wheel carried by the jack shaft and meshing with said worm, a pinion carried by the jack shaft and driven by the worm wheel, a gear carried by the driven shaft and meshing with said pinion, said gear being journaled on the driven shaft, overrunning clutch means interposed betweeen said gear and driven shaft, a spiral driving gear journaled on the driving shaft for relative movement therewith, a spiral driven gear fixed to the driven shaft and meshing with the spiral driving gear, an adjustable clutch driven by the driving shaft and including a driven element, a slip clutch driven by the driven element of the adjustable clutch and including a driven member fixed to said spiral driving gear for rotating the same and means for engaging and disengaging said adjustable clutch.

QUIDO P. MASSARE.
JEAN FYFE EDWARDS,
*Executrix of the Estate of Hilbert E. Edwards, Deceased.*

No references cited.